United States Patent Office 2,828,270
Patented Mar. 25, 1958

2,828,270

ION EXCHANGE RESINS DERIVED FROM VINYL PYRIDINE, POLYVINYLBENZENE AND STYRENE COMPOUNDS

Yoshiaki Murata, Los Angeles, Calif., assignor to National Aluminate Corporation, Chicago, Ill., a corporation of Delaware No Drawing. Application August 4, 1953
Serial No. 372,391

17 Claims. (Cl. 260—2.1)

The invention relates to a new resin having anion exchanging properties and more particularly, to a resin in which quaternary amine groups are joined together in long complex cross-linked structures.

This application is a continuation-in-part of my copending application, Serial No. 186,928, filed September 26, 1950, and now abandoned, and the disclosure of the latter application is incorporated herein and made a part hereof by reference as fully as if it were set forth herein in its entirety.

It has been known heretofore the quaternary amine nitrogen atoms have the ability of exchanging anions in saline aqueous solutions, but the quaternary amino groups in most quaternary amine compounds are so hydrophilic that they render the entire compound soluble in water and hence are of no value for extracting anions from the water.

One of the objects of the invention is to provide a water insoluble resin containing quaternary amine groups.

Another object is to provide a new process for removing anions from water. Other objects will appear hereinafter.

In accordance with the invention, new quaternary salts and hydroxides of new heteropolymers of a vinyl pyridine, a styrene and a polyvinylbenzene have been prepared.

These products were prepared by copolymerizing a vinyl pyridine with styrene or a substituted styrene and a polyvinylbenzene, and reacting the resultant product with a compound having the formula R.X, where R is an alkyl group and X is the negative radical of an acid. The hydroxides were prepared by reacting the resultant product with a base, e. g., sodium hydroxide, lithium hydroxide, potassium hydroxide, etc.

The copolymerization can be effected with or without a catalyst. If no catalyst is used, however, a non-uniform product results. It is preferable, therefore, to use a polymerization catalyst, for example, benzoyl peroxide, cumene hydroperoxide, or other peroxide catalyst.

The physical properties of the resin will vary depending upon the reactants, quantity of catalyst, relative proportions of the reactants, and reaction conditions.

A high concentration of vinyl pyridine produces resins which are thermoplastic. Too low a concentration of vinyl pyridine results in resins having low ion exchanging capacities. Low concentrations of polyvinylbenzene produce thermoplastic resins. Concentrations of peroxide catalyst above 0.2% by weight of the reactants result in a thermoplastic resin.

It has been found that certain proportions of the components are required for the production of a resin which when in the quaternary amine form is suitable for use as an anion exchange resin, having the requisite ion exchange capacity and physical properties, such as hardness, density, porosity, tackiness, expansiveness, and resistance to heat. Thus, a resin which is a useful anion exchanger in the quaternary amine form is prepared by copolymerizing the components in proportions that provide in the reactants and in the resin about 30 to 78 molar percent of a styrene, such as styrene itself, dischlorostyrene and alpha-methylstyrene, about 19 to 66 molar percent of a vinyl pyridine, such as 2-vinyl pyridine, 4-vinyl pyridine, and their homologues, and about 1.3 to 12 molar percent of a polyvinylbenzene, such as the divinyl and trivinyl benzenes.

In the alkylation of the copolymer to form a quaternary ammonium resin, the molar concentration of the alkylating agent is preferably equal to or greater than the molar concentration of the vinyl pyridine in the resin. Excellent results were obtained with methyl iodide as the alkylating agent. Other alkylating agents are dimethyl sulfate, diethyl sulfate, methyl chloride, ethyl chloride, methyl bromide and other lower alkyl halides containing less than six carbon atoms.

Moderate temperatures from room temperature (20 degrees C.) to 100 degrees C. are sufficient to effect the polymerization and alkylation reactions.

The following examples illustrate different methods of preparing the copolymers as well as different types of compounds falling within the scope of the invention but are not intended to limit the broader aspects of the invention.

EXAMPLE I

*Bulk polymerization*

| | Grams |
|---|---|
| Styrene | 52 |
| 2-vinylpyridine | 20 |
| Divinylbenzene (18%) | 40 |
| Benzoyl peroxide | 0.1 |

The charge was placed in a 250 ml. Erlenmeyer flask. The flask was stoppered and the solution was reacted at room temperature for 17 hours. The soft gel was reacted further in a hot water bath (70 to 80 degrees C.) for 5 hours. The hard gel was broken up and dried in the oven at 250 degrees F. for 18 hours. The dried resin was ground and screened (−12+30 mesh).

The resin was methylated in a 250 ml. Erlenmeyer flask with 35 grams of methyl iodide at room temperature for 72 hours. The resin was dried at 210 degrees F. for 3 hours. The quaternary amine exchange capacity was then determined and found to be between 6,000 and 7,000 grains per cubic foot.

EXAMPLE II

*Suspension polymerization*

Charge:

| | | |
|---|---|---|
| Styrene | grams | 15 |
| 2-vinylpyridine | do | 15 |
| Divinyl benzene (18%) | do | 5 |
| Polyvinyl alcohol | cc | [1] 30 |
| Water | cc | 300 |
| Benzoyl peroxide | grams | 0.5 |

[1] 0.5% solution.

The polyvinyl alcohol solution and water were placed in a 1 liter, 3-necked, round-bottom flask equipped with a reflux condenser, a stirrer, and a thermometer. Styrene, 2-vinylpyridine, divinylbenzene, and benzoyl peroxide mixture were added and the mixture was stirred at a moderate speed, and reacted at 50 degrees C. for 3 hours. The temperature was then raised to 70 to 80 degrees C. and reacted at this temperature for 3 hours. The beads were poured into a beaker, treated with dilute hydrochloric acid, filtered, washed with water, and dried at 60 to 70 degrees C. for 17 hours. The beads were then treated with sodium carbonate solution, filtered, washed with water and redried at 100 degrees C. for 17 hours.

The dried beads were methylated in a 250 ml. Erlenmeyer flask with methyl iodide (25 grams) at room temperature for 6 hours, then dried at 100 degrees C. for 2 hours. The ion exchange capacity was determined and found to be around 3400 grains per cubic foot.

EXAMPLE III

Thirty-five (35) grams dichlorostyrene, 20 grams 2-vinyl pyridine, 5 grams divinylbenzene (commercial grade divinylbenzene containing 18% divinylbenzene, the rest being styrene, ethylbenzene and other hydrocarbons), and 0.1 gram of benzoylperoxide were suspended in 300 ml. of aqueous solution of 0.02 gram of Methocel (low viscosity methyl cellulose having a viscosity of about 50 centipoises made by Dow Chemical Company). The mixture was stirred energetically and heated to 50 to 80 degrees C. for 5 hours. The resulting beads were filtered off and dried at 90 degrees C. for 17 hours. The dried product was methylated with 30 grams of methyl iodide at room temperature for 4 hours. The methylated product was then placed in a glass tube and converted to the hydroxyl form by passing 250 ml. of 10% aqueous sodium hydroxide solution slowly through the bed of beads in the tube. The excess base was washed out with distilled water by repeated rinsings until the effluent water gave no alkalinity to phenolphthalein indicator. Two hundred fifty (250) ml. of 10% NaCl solution was run through the basic resin and 250 ml. of wash water followed. The water from the sodium chloride solution and the wash water were collected and the alkalinity of the water was titrated with standard acid. This resin had a capacity of a 2,900 grains per cubic foot of exchanging anion calculated as $CaCO_3$.

EXAMPLE IV

Forty (40) grams of 2-vinyl pyridine, 52 grams of styrene, 20 grams of divinylbenzene (18%) and 0.1% benzoyl peroxide were polymerized at room temperature for 204 hours. The resulting resin was broken up and methylated with 30 grams of methyl iodide at room temperature for 17 hours. The resulting product when converted to the alkaline form as in Example III and treated with the brine solution had a capacity of 7,000 grains per cubic foot as $CaCO_3$.

The following tables illustrate the results obtained in preparing copolymers and quaternary salts thereof from various reactants under varying conditions. In Table II the products corresponding to Examples XVII to XXIV were not converted to quaternary salts since they were too soft or had physical properties not suitable for ion exchange.

TABLE I.—BULK POLYMERIZATION

| Example No. | 2-Vinyl-Pyridine, gm. | Styrene, gm. | Divinyl-Benzene (18%), gm. | Benzoyl Peroxide, gm. | Condition of Exp. | | Drying | | Physical Property |
|---|---|---|---|---|---|---|---|---|---|
| | | | | | Temp., °C. | Time, hr. | Temp., °F. | Time, hr. | |
| V | 26 | 52 | 10 | 0.1 | 70–80 | 2 | | | gel. |
| VI | 12 | 45 | 15 | 0.1 | 80 | | | | Do. |
| VII | 13 | 52 | 25 | 0.1 | room / 60–75 | 18 / 4 | | | Do. |
| VIII | 13 | 52 | 25 | 0.1 | room / 60–75 | 18 / 4 | | | hard red resin. |
| IX | 13 | 52 | 12.5 | 0.1 | room / 70–80 | 18 / 6 | 180 | 72 | Do. |
| X | 17.5 | 52 | 20 | 0.1 | room / 60–70 | 2 / 2 | 230 | 17 | Do. |
| XI | 20 | 52 | 40 | 0.2 | room / 70–80 | 72 / 5 | 250 | 18 | Do. |
| XII | 13 | 52 | 25 | 0.1 | room / 70–80 | 19 / 7 | 260 | 18 | Do. |
| XIII | 13 | 52 | 25 | 0.1 | room / 70–80 | 19 / 7 | 240 | 24 | Do. |
| XIV | 20 | 52 | 25 | 0.1 | room / 70–80 | 19 / 7 | 240 | 24 | Do. |
| XV | 40 | 52 | 20 | 0.1 | room | 204 | | | Do. |
| XVI | 30 | 52 | 22 | 1.0 | room / 80 | 72 / 14 | 240 / 214 | 24 / 17 | Do. |
| XVII | 40 | 52 | 22 | 1.0 | room / 80 | 72 / 14 | 240 / 214 | 24 / 17 | soft resin. |
| XVIII | 53 | 52 | 22 | 1.0 | room / 80 | 72 / 14 | 240 / 214 | 24 / 17 | Do. |
| XIX | 53 | 52 | 22 | 0.0 | room / 80 | 72 / 14 | 240 / 214 | 24 / 17 | nonuniform resin. |
| XX | 60 | 52 | 22 | 1.0 | room / 80 | 72 / 14 | 240 / 214 | 24 / 17 | soft resin. |
| XXI | 80 | 52 | 22 | 1.0 | room / 80 | 72 / 14 | 240 / 214 | 24 / 17 | Do. |
| XXII | 53 | 52 | 10 | 1.0 | room / 80 | 72 / 14 | 240 / 214 | 24 / 17 | Do. |
| XXIII | 53 | 52 | 10 | 1.0 | room / 80 | 72 / 14 | 240 / 214 | 24 / 17 | Do. |
| XXIV | 53 | 26 | 10 | 0.0 | room / 80 | 72 / 14 | 240 / 214 | 24 / 17 | nonuniform resin. |

TABLE II

| Example No. | Product of Example No. | Methyl Iodide, gm. | Reaction Time | | Drying | | Physical Property after treat. with NaOH | Capacity, gr./ft.³ as $CaCO_3$ |
|---|---|---|---|---|---|---|---|---|
| | | | Temp., °C. | Time, hr. | Temp., °F. | Time, hr. | | |
| XXV | V | 40 | 90 | 10 | 210 | 5 | Swells in $H_2O$ color throw. | |
| XXVI | VI | 20 | 40 | 3 | 170 | 24 | Slightly soft, color throw. | 1,150 |
| XXVII | VII | 10 | room | 6 | 180 | 72 | Swelled and soft | 1,615 |
| XXVIII | VIII | 10 | do | 17 | 170 | 17 | 50% expansion | 5,000 |
| XXIX | IX | 18 | do | 17 | 170 | 17 | 50% expansion, soft | 3,630 |
| XXX | X | 30 | do | 1½ | 200 | 18 | do | 4,500 |
| XXXI | XI | 35 | do | 2½ | 220 | 20 | Little expansion, hard | 3,400 |
| XXXII | XII | 60 | do | 1½ | 210 | 80 | No expansion, hard | 3,400 |
| XXXIII | XIII | 50 | do | 1½ | 220 | 3 | do | 2,800 |
| XXXIV | XIV | 50 | do | 1½ | 220 | 3 | do | 4,600 |
| XXXV | XV | 30 | do | 17 | | | Little expansion | 7,000 |
| XXXVI | XVI | 30 | do | 17 | 212 | 4 | Swelled, color throw | |

TABLE III.—SUSPENSION POLYMERIZATION

| Example No. | Styrene, gm. | Dichloro Styrene, gm. | 2-vinyl Pyridine, gm. | Divinyl Benzene (18%), gm. | Benzoyl Peroxide, gm. | Reaction Temp., °C. | Reaction Time, hr. | Drying Temp., °C. | Drying Time, Hr. | Physical Properties |
|---|---|---|---|---|---|---|---|---|---|---|
| XXXVII | 25 | | 30 | 10 | .5 | 8 | 1 | 130 | 2 | Granular resin. |
| XXXVIII | 25 | | 30 | 10 | 1.0 | 30–80 | 6 | 60–70 | 24 | Hard, brown beads. |
| XXXIX | 80 | | 30 | 10 | .2 | 30–80 | 6 | 60–70 | 24 | Beads. |
| XL | | 25 | 16 | 5 | .1 | 65–75 | 6 | 80 | 72 | Do. |
| XLI | | 43 | 26.5 | 7 | .1 | 75 | 7 | 80 | 72 | Do. |
| XLII | | 40 | 25 | 10 | .1 | 75 | 6 | | | Do. |
| XLIII | | 43 | 26.5 | 7 | .1 | 75 | 6 | 80 | 72 | Do. |
| XLIV | | 43 | 26.5 | 7 | .1 | 40 | 2 | 50 | 72 | Do. |
| XLV | | 35 | 28 | 5 | .1 | 50 | 18 | | | Do. |
| XLVI | | 35 | 20 | 5 | .1 | 50–80 | 5 | 90 | 17 | Do. |
| XLVII | 18 | | 30 | 20 (40%) | .5 | 80 | 15 | 100 | 17 | Do. |
| XLVIII | 10 | | 20 | 10 (40%) | .1 | 80 | 15 | 100 | 17 | Do. |

TABLE IV

| Example No. | Product of Example No. | MeI, gm. | Drying Temp., °C | Drying Time, hr. | Capacity, gr./ft.³, as CaCO₃ | Physical Property |
|---|---|---|---|---|---|---|
| XLIX | XL | 40 | | | 3,435 | Hard, heavy resin. |
| L | XLVI | 30 | | | 2,900 | Hard. |

Alpha methyl styrene and other polymerizable homologues may be used instead of the styrene or dichlorostyrene in the foregoing examples so long as the substituent groups other than the vinyl group are inert. The products made from dichlorostyrene were heavier and had better physical properties than those obtained from styrene.

Instead of 2-vinylpyridine, isomers and homologues thereof and of the isomers may be used in making the copolymers. Trivinylbenzene may be employed in place of divinylbenzene.

Quaternary amine compounds are unstable to heat, especially in the hydroxyl form, but even the chloride or sulphate salts should not be heated above 150 degrees C. for any extended period. The hydroxyl form of the resin should not be heated above about 60 degrees C. for any long periods, since the quaternary group will break down.

An advantage of the present product is that the quaternary amine groups are such strong bases that upon being converted to the hydroxyl form by sodium hydroxide or any other strong alkali metal hydroxide a strong base results which will remove chloride ions from a dilute solution of sodium chloride replacing them with hydroxyl ions. This makes it possible to remove the anion from an aqueous solution first and the cations afterwards. This is especially efficacious where the salts are being removed from a product such as sugar which will hydrolyze in the presence of hydrogen ion.

A further advantage of these products in their alkaline form is that they can act as basic catalysts where the base is in a captive form. That is, it is tied to the solid granules and cannot diffuse through the reaction media. When the reaction is completed the catalyst can be removed by merely filtering the catalyst from the reaction zone. Such a procedure has a great advantage over the common practice where the catalyst must be neutralized with acid and finally the product must be distilled or extracted from the resulting salt solution.

The invention is hereby claimed as follows:

1. A water-insoluble resinous composition from the group consisting of the lower alkyl quaternary ammonium salts and hydroxides of a copolymer of from 19 to 66 molar percent of vinyl pyridine, from 1.3 to 12 molar percent of polyvinylbenzene and from 30 to 78 molar percent of a compound from the group consisting of styrene, dichlorostyrene and alpha-methylstyrene.

2. A water-insoluble lower alkyl quaternary ammonium salt of a hard resinous copolymer of from 19 to 66 molar percent of 2-vinyl pyridine, from 1.3 to 12 molar percent of divinylbenzene and from 30 to 78 molar percent of styrene.

3. A water-insoluble lower alkyl quaternary ammonium hydroxide of a hard resinous copolymer of from 19 to 66 molar percent of 2-vinyl pyridine, from 1.3 to 12 molar percent of divinylbenzene and from 30 to 78 molar percent of styrene.

4. A water-insoluble lower alkyl quaternary ammonium salt of a hard resinous copolymer of from 19 to 66 molar percent of 2-vinyl pyridine, from 1.3 to 12 molar percent of divinylbenzene and from 30 to 78 molar percent of dichlorostyrene.

5. A water-insoluble lower alkyl quaternary ammonium hydroxide of a hard resinous copolymer of from 19 to 66 molar percent of 2-vinyl pyridine, from 1.3 to 12 molar percent of divinylbenzene and from 30 to 78 molar percent of dichlorostyrene.

6. A water-insoluble lower alkyl quaternary ammonium salt of a hard resinous copolymer of from 19 to 66 molar percent of 2-vinyl pyridine, from 1.3 to 12 molar percent of divinylbenzene and from 30 to 78 molar percent of alpha-methylstyrene.

7. A water-insoluble lower alkyl quaternary ammonium hydroxide of a hard resinous copolymer of from 19 to 66 molar percent of 2-vinyl pyridine, from 1.3 to 12 molar percent of divinylbenzene and from 30 to 78 molar percent of alpha-methylstyrene.

8. An anion exchange resin consisting essentially of a water-insoluble methyl iodide quaternary ammonium salt of a hard resinous copolymer of from 19 to 66 molar percent of 2-vinyl pyridine, from 1.3 to 12 molar percent of divinylbenzene and from 30 to 78 molar percent of styrene.

9. An anion exchange resin consisting essentially of a water-insoluble methyl iodide quaternary ammonium salt of a hard resinous copolymer of from 19 to 66 molar percent of 2-vinyl pyridine, from 1.3 to 12 molar percent of divinylbenzene and from 30 to 78 molar percent of dichlorostyrene.

10. An anion exchange resin consisting essentially of a water-insoluble methyl quaternary ammonium hydroxide of a hard resinous copolymer of from 19 to 66 molar percent of 2-vinyl pyridine, from 1.3 to 12 molar percent of divinylbenzene and from 30 to 78 molar percent of styrene.

11. An anion exchange resin consisting essentially of a water-insoluble methyl quaternary ammonium hydroxide of a hard resinous copolymer of from 19 to 66 molar percent of 2-vinyl pyridine, from 1.3 to 12 molar percent of divinylbenzene and from 30 to 78 molar percent of dichlorostyrene.

12. A method of removing anions from a solution containing the same which comprises bringing said solution into contact with a resinous water-insoluble lower alkyl quaternary ammonium compound of a hard resinous copolymer of from 19 to 66 molar percent of vinyl pyridine, from 1.3 to 12 molar percent of polyvinylbenzene and from 30 to 78 molar percent of a compound from the group consisting of styrene, dichlorostyrene and alpha-methylstyrene.

13. A method of removing anions from a solution containing the same which comprises bringing said solution into contact with a resinous water-insoluble lower alkyl quaternary ammonium compound of a hard resinous copolymer of from 19 to 66 molar percent of 2-vinyl pyridine, from 1.3 to 12 molar percent of divinylbenzene and from 30 to 78 molar percent of styrene.

14. A method of removing anions from a solution containing the same which comprises bringing said solution into contact with a resinous water-insoluble lower alkyl quaternary ammonium compound of a hard resinous copolymer of from 19 to 66 molar percent of 2-vinyl pyridine, from 1.3 to 12 molar percent of divinylbenzene and from 30 to 78 molar percent of dichlorostyrene.

15. A method of removing anions from a solution containing the same which comprises bringing said solution into contact with a resinous water-insoluble methyl quaternary ammonium compound of a hard resinous copolymer of from 19 to 66 molar percent of vinyl pyridine, from 1.3 to 12 molar percent of polyvinylbenzene and from 30 to 78 molar percent of a compound from the group consisting of styrene, dichlorostyrene and alpha-methylstyrene.

16. A method of removing anions from a solution containing the same which comprises bringing said solution into contact with a resinous water-insoluble methyl quaternary ammonium hydroxide of a hard resinous copolymer of from 19 to 66 molar percent of 2-vinyl pyridine, from 1.3 to 12 molar percent of divinylbenzene and from 30 to 78 molar percent of styrene.

17. A method of removing anions from a solution containing the same which comprises bringing said solution into contact with a resinous water-insoluble methyl quaternary ammonium hydroxide of a hard resinous copolymer of from 19 to 66 molar percent of 2-vinyl pyridine, from 1.3 to 12 molar percent of divinylbenzene and from 30 to 78 molar percent of dichlorostyrene.

References Cited in the file of this patent
UNITED STATES PATENTS

| | | |
|---|---|---|
| 2,540,984 | Jackson | Feb. 6, 1951 |
| 2,540,985 | Jackson | Feb. 6, 1951 |